United States Patent [19]

Kowalski et al.

[11] Patent Number: 5,018,188
[45] Date of Patent: May 21, 1991

[54] MICROPHONE-CONTROLLER WITH MULTIFUNCTION, SINGLE CONDUCTOR

[75] Inventors: Joseph L. Kowalski, Fox River Grove; Daniel S. Rokusek, Hoffman Estates, both of Ill.

[73] Assignee: Motorola, Inc., Schaumburg, Ill.

[21] Appl. No.: 453,877

[22] Filed: Dec. 20, 1989

[51] Int. Cl.⁵ .............................................. H04M 11/00
[52] U.S. Cl. ......................................... 379/63; 379/58
[58] Field of Search ................................. 381/111–115; 379/58, 59, 63; 455/77

[56] References Cited

U.S. PATENT DOCUMENTS

| | | | |
|---|---|---|---|
| 3,786,200 | 1/1974 | Camonzind | 381/112 |
| 4,317,222 | 2/1982 | Bell et al. | 455/77 |
| 4,378,467 | 3/1983 | Ferrontelli | 381/111 |
| 4,455,454 | 6/1984 | Umebayashi | 379/63 |
| 4,455,534 | 6/1984 | Gillig | 330/51 |
| 4,499,335 | 2/1985 | Lyle | 381/111 |
| 4,614,839 | 9/1986 | Umebayashi | 379/63 |
| 4,654,655 | 3/1987 | Kowalski | 340/825.5 |
| 4,698,838 | 10/1987 | Ishikawa et al. | 379/58 |
| 4,870,676 | 9/1989 | Lewo | 379/58 |

OTHER PUBLICATIONS

Motorola Inc., Publication No. 68P81115E38-D, published Nov. 5, 1985, V.S.P. Hands-Free Option, Model T375A Series.
Motorola Inc., Publication No. 68P81117E63-O, published Nov. 8, 1985, V.S.P. Hands-Free Option, Model T944 Series.

Primary Examiner—Jin F. Ng
Assistant Examiner—Dwayne D. Bost
Attorney, Agent, or Firm—Kenneth W. Bolvin

[57] ABSTRACT

The single power conductor carries audio and a serial data bus. The microphone's amplifier (102) is connected to the conductor (108). The incoming audio signal rides on the DC supply voltage from the radiotelephone. The supply voltage, through a voltage regulator (103), supplies power to the amplifier (102) and a microprocessor (105), used to transmit the serial data message on the conductor (108). Both the amplifier (102) and the voltage regulator (103) are isolated from the power conductor (108) by a FET switch (104) that is controlled by the microprocessor (105). The switch (104) is turned off, isolating the circuitry when the microprocessor (105) is transmitting.

8 Claims, 2 Drawing Sheets

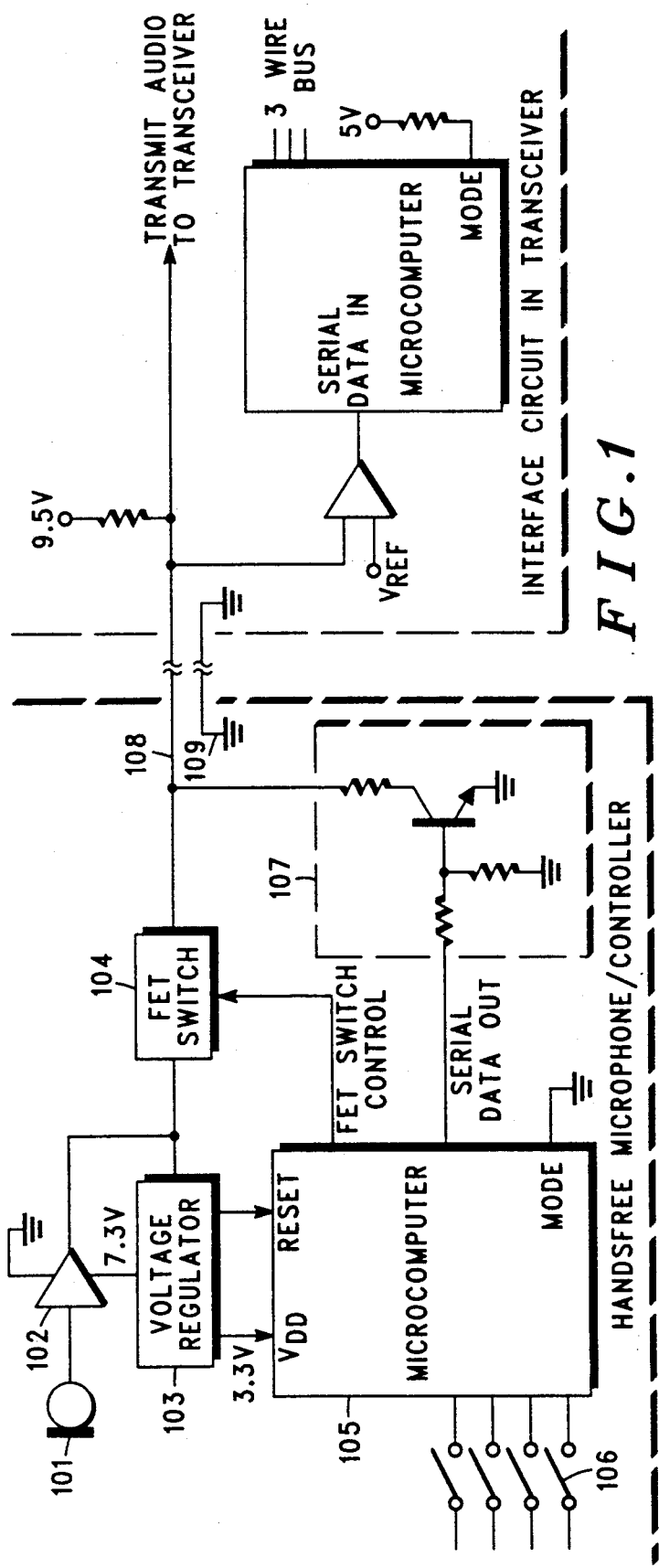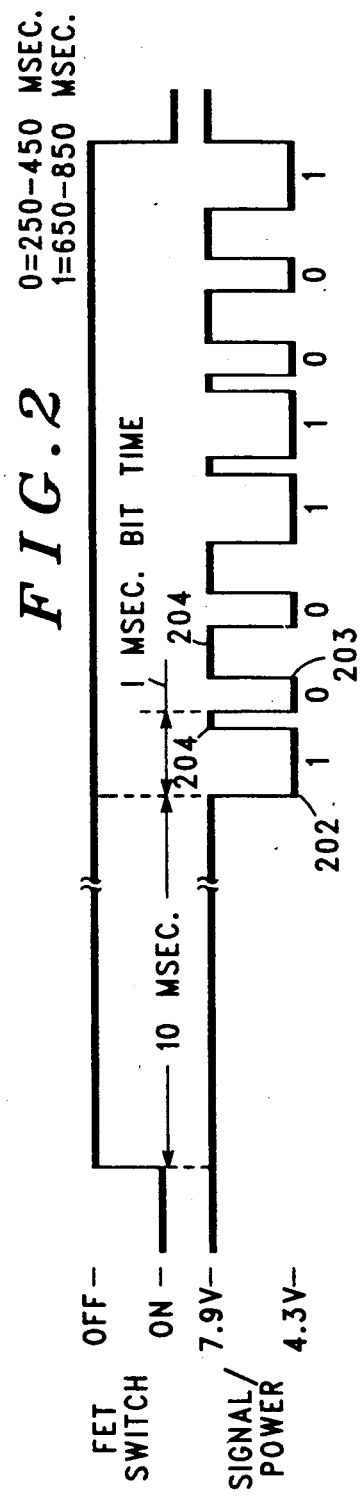

MICROPHONE-CONTROLLER WITH MULTIFUNCTION, SINGLE CONDUCTOR

FIELD OF THE INVENTION

The present invention relates generally to the communications field and particularly to the cellular radiotelephone field.

BACKGROUND OF THE INVENTION

Cellular mobile radiotelephones allow users in cars to remain in contact with the landline telephone system while traveling. This form of communication typically has the disadvantage of requiring the user to hold a telephone handset to communicate. This can cause problems when another task must be performed simultaneously with communicating, such as driving or writing.

This problem has been solved by the implementation of a hands-free mode of operation for the cellular radiotelephone. This is accomplished by using a speaker and microphone separate from the speaker and microphone in the radiotelephone's handset. The extra speaker can be built in to the radiotelephone housing or in a separate housing. The hands-free microphone, for improved voice reception, is typically separate from the radiotelephone housing and is mounted near the user, such as on the driver's visor.

While the external speaker and microphone free the user's hands during a call, the user must still look down at the radiotelephone to operate the controls for dialing a number. If the user is driving at the time a call is made, a dangerous situation can result because of the time required to look down to dial a number.

One solution to this problem is to locate a limited number of control buttons in the hands-free microphone housing. If the microphone is mounted near the user, the need to look away from the road is reduced and, if a relatively small number of buttons are used, the user may even be able to use the buttons by memorizing their locations.

The mounting of controls in the microphone housing requires a greater number of wires in the interface cable to the radiotelephone than if only the microphone were present. A larger number of wires in the cable will result in a thicker cable, creating a problem of installing the cable between the radiotelephone and the hands-free microphone without detracting from the automobile interior's appearance. There is a resulting need, therefore, to provide control functions in the hands-free microphone using a minimum number of wires.

SUMMARY OF THE INVENTION

The present invention provides a method and apparatus of adding control buttons to a hands-free microphone using only power and ground conductors. The power conductor acts as an audio signal conductor and a serial data bus in addition to being a power conductor.

The apparatus consists of the power conductor and its associated ground conductor. The power conductor is connected to a voltage regulator that provides the voltages to power the circuitry, including a microprocessor and an audio amplifier, in the hands-free microphone housing. The microphone is connected to the power conductor through the audio amplifier. Both the voltage regulator and the audio amplifier can be isolated from the power conductor by a FET switch that is controlled by the microprocessor.

A number of input switches are connected to the microprocessor. The microprocessor determines which input switch was closed and encodes this into a signal to be transmitted on the power conductor by a bus driver. The bus driver is not isolated from the power conductor by the FET switch.

BRIEF DESCRIPTION OF THE DRAWINGS

FIG. 1 shows a block diagram of the preferred embodiment of the present invention.

FIG. 2 shows a timing diagram of the relationship between the FET switch and the serial data bus.

DETAILED DESCRIPTION OF THE PREFERRED EMBODIMENT

Figure 3:
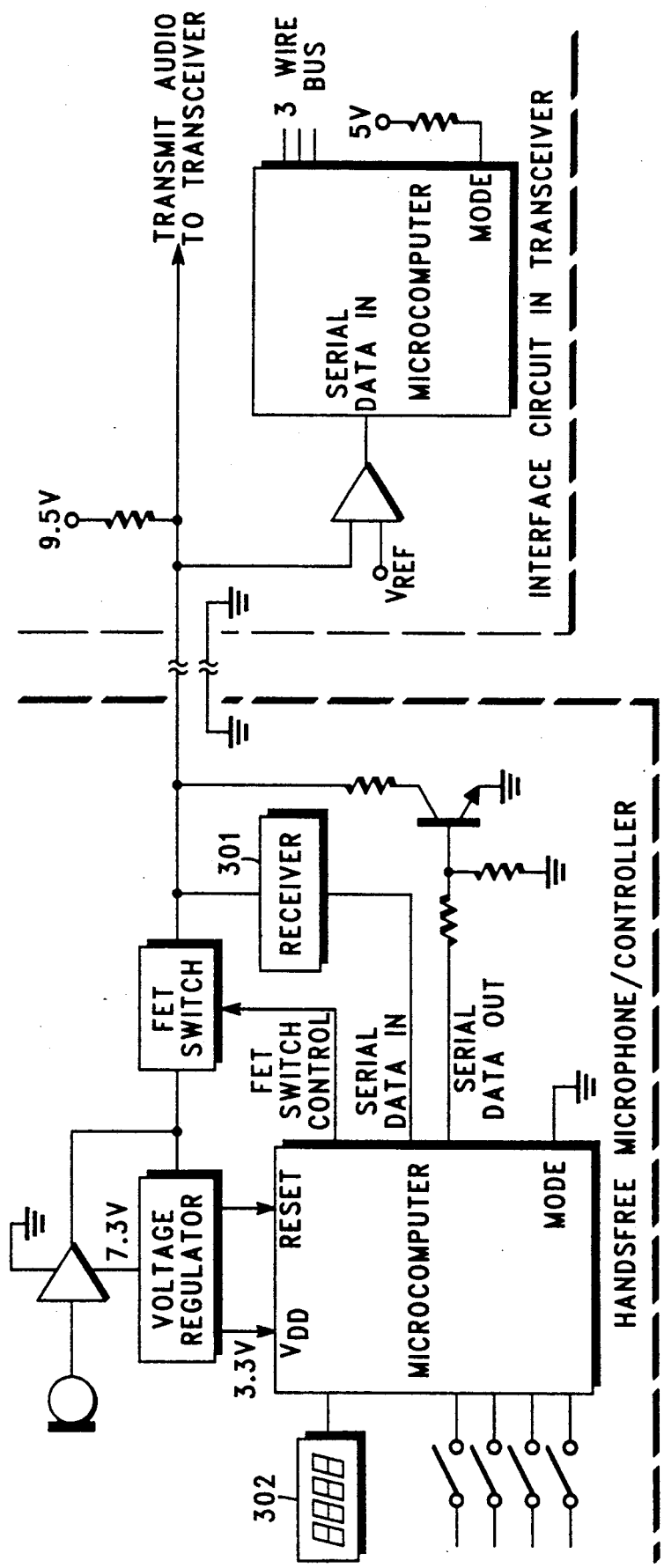
FIG. 3 shows a block diagram of an alternate embodiment of the present invention.

The present invention allows push-button switches to be added to a hands-free microphone without increasing the number of conductors in the interface between the microphone and the radiotelephone. This is accomplished by using the power conductor as a serial data bus and for conducting the audio signal from the microphone in addition to supplying power to the apparatus.

The preferred embodiment of the apparatus is illustrated in FIG. 1. In addition to the power conductor (108), which also acts as a serial data bus, and its associated ground conductor (109), the apparatus consists of a microphone (101), an audio amplifier (102), a field-effect transistor (FET) switch (104), and a voltage regulator (103). A microprocessor (105) controls the apparatus and a number of input switches (106) connected to the microprocessor (105) enter data to be transmitted on the power conductor by a bus driver (107).

In operation, the hands-free microphone and its related circuitry is powered by the power conductor (108) with its associated ground conductor. In the preferred embodiment, the radiotelephone provides a 9.50 $V_{dc}$ supply voltage, through a 1.0 kΩ resistor, between the power and ground (109) conductors. The voltage regulator (103) uses the supply voltage to provide approximately 7.50 $V_{dc}$ to power the amplifier (102) and 3.30 $V_{dc}$ to power the microprocessor (105).

The power conductor (108) also carries the audio from the microphone (101). The amplifier (102) amplifies the audio signal that has been input through the microphone (101). The amplified audio signal rides on the supply voltage, 8.2 volts, on the power conductor (108). The audio signal can be up to 4 volts peak to peak. The radiotelephone's transceiver uses this audio signal for transmission.

The power conductor (108) additionally acts as a serial data bus. The bus (108) interfaces to receive and decode circuitry at the radiotelephone end of the bus (108). The decode circuitry begins looking for the start of a serial data message, a low going edge, after a bus reset, which is a 5 ms high on the bus (108). Since the audio is transmitted on the same conductor (108), the low for the message start has to be below the worst case low for the audio signal to avoid causing a message start when the audio goes low. In the preferred embodiment, a low level is 4.3 $V_{dc}$. A high level is defined as 8.2 $V_{dc}$.

In the preferred embodiment, the data to be transmitted from the controller end on the bus (108) is entered by four push-button switches (106). The switches (106) are connected to the microprocessor (105). The first three switches (106) are used for memory recall of telephone numbers. The fourth switch (106) is a multifunction switch that is used for starting and ending a telephone call, clearing entered digits, and muting the handset microphone during a telephone call. Each switch (106) is assigned a unique two bit code that is sent four times in succession, the second and fourth pair being the complement of the switch code. The microprocessor (105) determines which switch (106) has been depressed, and sends the appropriate code on the power conductor (108) in serial form. Every switch (106) closure is followed by a release code. Table 1 illustrates the codes assigned to the respective switches (106) in the preferred embodiment.

TABLE 1

| SWITCH 1 | (10)(01)(10)(01) |
| SWITCH 2 | (01)(10)(01)(10) |
| SWITCH 3 | (00)(11)(00)(11) |
| MULTIFUNCTION SWITCH | (11)(00)(11)(00) |
| RELEASE | (11)(11)(11)(11) |

As illustrated in FIG. 2, each bit of a switch code is sent in 1 ms±50 μs and is represented by a different length low going pulse of the supply voltage that begins at the start of the bit time. A zero is defined as a 250–450 μs low going pulse (203) and a one is defined as a 650–850 μs low going pulse (202). The remainder of the bit time of both the zero and one digit after the low pulse is a high level (204).

The FET switch (104), controlled by the microprocessor (105), is used to isolate the power conductor/data bus (108) from the circuitry, with the exception of the bus driver (107), on the hands-free microphone end of the bus. This ensures that the capacitive load on the bus (108) at the hands-free microphone end does not corrupt the rise and fall time of the data when transmitting on the bus (108).

As illustrated in the timing diagram in FIG. 2, the switch (107) is turned off, which opens the line and isolates the bus (108), 10 ms before the microprocessor (105) starts to transmit its serial data stream. The 10 ms delay, in case the audio signal plus coupled noise goes below the low threshold of the decode circuitry thereby starting a decode sequence, ensures that the receive end is in a reset state prior to receiving the data stream. In addition, the decode circuitry must receive three of the four data bit pairs correctly before decoding is started. Also, there must be a complete transmission of eight total bits before the decode is performed.

Since power to the microprocessor (105) is cut off when the FET switch (104) is off, the microprocessor (105) runs off a capacitive charge stored in the voltage regulator (103). With this charge, the worst case minimum time the microprocessor (105) will continue to run is 50 ms. This is enough time for the microprocessor (105) to complete its transmission since the FET switch (104) is only off for 18 ms. The FET switch (104) is turned on after the bus transmission to allow the audio signal access to the power conductor (108) and to allow the power conductor (108) to supply power to the circuitry.

In alternate embodiments, the number of push button switches on the hands-free microphone-controller can be increased or decreased without departing from the scope of the present invention. In addition, the codes sent when the buttons are pushed and the length of the data word may vary for different applications. A display (302), such as an LCD as illustrated in FIG. 3, can be added to the microphone-controller to display data sent over the bus. A receiver (301) can also be added, to make the serial data bus bidirectional. This would allow data to be sent from the radiotelephone end to the microphone-controller as well as from the microphone-controller to the radiotelephone.

The multifunction interface described above permits control functions to be added to a hands-free microphone without increasing the number of conductors required to interface the microphone to the main unit. The present invention provides power, audio, and a serial data bus on the same conductor. While the preferred embodiment uses a radiotelephone as the main unit, any communication transceiver having the required decoding circuitry can be used; an alternate embodiment being a radio.

We claim:

1. A microphone-controller apparatus, for providing an audio signal and control signals, coupled by a multifunction, single conductor to transceiving means, the apparatus comprising:
    (a) an electroacoustic transducer for generating the audio signal;
    (b) amplifying means, for amplifying the audio signal, having an input coupled to the electroacoustic transducer and an output coupled to the multifunction, single conductor;
    (c) controllable isolation means for isolating the amplifying means and the voltage regulation means from the multifunction, single conductor;
    (d) voltage regulation means for regulating a first voltage provided by the transceiver means over the multifunction, single conductor, thereby providing a predetermined second voltage to the microphone-controller apparatus; and
    (e) processing means for controlling the apparatus, the controllable isolation means, and generating the control signals to be transmitted over the multifunction, single conductor.

2. The microphone-controller of claim 1 wherein the controllable isolation means is a field-effect transistor switch.

3. The microphone-controller of claim 1 wherein the processing means is a microprocessor.

4. The microphone-controller of claim 1 and further including indication means, coupled to the processing means, for displaying data.

5. A microphone-controller apparatus, for providing and audio signal and control signals, coupled by a multifunction, single conductor to a radiotelephone, the apparatus comprising:
    (a) an electroacoustic transducer for generating the audio signal;
    (b) amplifying means, for amplifying the audio signal, having an input coupled to the electrocoustic transducer and an output coupled to the multifunction, single conductor;
    (c) voltage regulation means for regulating a first voltage provided by the radiotelephone over the multifunction, single conductor, thereby providing a predetermined second voltage to the microphone-controller apparatus;
    (d) controllable isolation means for isolating the amplifying means and the voltage regulation means from the multifunction, single conductor;
    (e) processing means for controlling the controllable isolation means and generating the control signals for transmission on the multifunction, single conductor to the radiotelephone; and (f) switching means, coupled to the processing means, for entering data to be encoded, by the processing means, into the control signals.

6. The microphone-controller of claim 5 wherein the controllable isolation means is a field-effect transistor switch.

7. The microphone-controller of claim 5 wherein the processing means is a microprocessor.

8. The apparatus of claim 5 and further including indication means, for displaying data, coupled to the processing means.

* * * * *